(12) United States Patent
Zou et al.

(10) Patent No.: US 11,463,473 B2
(45) Date of Patent: Oct. 4, 2022

(54) LARGE-SCALE MALWARE CLASSIFICATION SYSTEM

(71) Applicant: SHANGHAI JIAOTONG UNIVERSITY, Shanghai (CN)

(72) Inventors: Futai Zou, Shanghai (CN); Yongkang Jiang, Shanghai (CN); Yue Wu, Shanghai (CN); Ping Yi, Shanghai (CN); Guangtao Xue, Shanghai (CN); Jianhua Li, Shanghai (CN); Weidong Qiu, Shanghai (CN); Cunqing Hua, Shanghai (CN)

(73) Assignee: SHANGHAI JIAOTONG UNIVERSITY, Shanghai (CN)

( * ) Notice: Subject to any disclaimer, the term of this patent is extended or adjusted under 35 U.S.C. 154(b) by 455 days.

(21) Appl. No.: 16/709,740

(22) Filed: Dec. 10, 2019

(65) Prior Publication Data

US 2021/0176258 A1    Jun. 10, 2021

(51) Int. Cl.
*H04L 9/40*    (2022.01)
*G06N 3/08*    (2006.01)
*G06N 3/04*    (2006.01)
*G06F 16/28*    (2019.01)

(52) U.S. Cl.
CPC .......... *H04L 63/145* (2013.01); *G06F 16/285* (2019.01); *G06N 3/04* (2013.01); *G06N 3/08* (2013.01); *H04L 63/1416* (2013.01)

(58) Field of Classification Search
CPC . H04L 63/145; H04L 63/1416; G06F 16/285; G06F 21/56; G06N 3/04; G06N 3/08; G06N 3/0454
See application file for complete search history.

(56) References Cited

U.S. PATENT DOCUMENTS

| | | | |
|---|---|---|---|
| 8,769,683 B1 * | 7/2014 | Oliver | G06F 21/561 |
| | | | 719/311 |
| 9,465,939 B2 * | 10/2016 | Aime | G06F 21/563 |
| 11,182,481 B1 * | 11/2021 | Oliver | G06N 20/00 |
| 2018/0082064 A1 * | 3/2018 | Wang | G06N 5/003 |
| 2019/0114539 A1 * | 4/2019 | Chistyakov | G06N 5/003 |
| 2020/0005093 A1 * | 1/2020 | Vichare | H04Q 9/00 |

* cited by examiner

*Primary Examiner* — Beemnet W Dada
(74) *Attorney, Agent, or Firm* — Dragon Sun Law Firm, PC; Jinggao Li; Nathaniel Perkins

(57) ABSTRACT

The present disclosure provides a large-scale malware classification system, comprising a client for unloading malware and a server for receiving and classifying the malware, wherein the server comprises a deep learning module for classifying the malware.

8 Claims, 2 Drawing Sheets

LARGE-SCALE MALWARE CLASSIFICATION SYSTEM

TECHNICAL FIELD

The present disclosure belongs to the technical filed of information safety and relates to a large-scale malware classification system. The present disclosure also relates to a large-scale malware classification process.

DESCRIPTION OF RELATED ART

Malware is a term for all software that intends to cause harm or inflict damage on computer systems. Recently, with introducing of polymorphic and metamorphic techniques, malicious software gets explosive growth on both quality and quantity. Malware classification has always been a concerned field in recent decade, which is an issue of giving a malicious sample i, calculating a family label j from knowledge base. Hence, malware classification can associate a fresh variant to a known family, which is meaningful to malware detection.

The researches indicate that the vast volume of data which needs to be detected is becoming one of the major challenges of anti-malware companies. Traditional signature-based and behavior-based malware analysis techniques are difficult to meet the demand, and a more effective method is needed.

Deep learning is a good choice, under the gpu acceleration, a model can be easily trained and the detection is even more efficient. In addition, inspired by the excellent performance of convolution neural network in image field, the present disclosure provides a scheme to explore a simpler model, converting malware classification tasks into image classification problems.

In fact, recent research of malware analysis, both static and dynamic, is moving from traditional aspects to deep learning. Royi et al. make a comparison between research papers using Microsoft malware classification challenge dataset (BIG2015). The results suggest that none of 12 papers in 2016 introducing deep learning, but 5 of 17 papers in 2017. Although most of them still rely on solid domain knowledge, researchers are exploring an end-to-end model to extract and fuse malware features automatically (Ronen, R., Radu, M., Feuerstein, C. E., Yomtov, E., Ahmadi, M.: Microsoft malware classification challenge. arXiv: Cryptography and Security (2018)).

Nataraj et al. propose first malware embedding method called NatarajImage based on binary file in 2011 (Nataraj, L., Karthikeyan, S., Jacob, G., Manjunath, B.: Malware images: visualization and automatic classification. In: Proceedings of the 8th international symposium on visualization for cyber security. p. 4. ACM (2011)). Although NatarajImage is believed vulnerable to obfuscation and packing techniques, their work has been followed by many others. Andrew et al. propose another malware embedding method named AndrewImage based on disassembly file at Black Hat conference 2015 (Andrew Davis, M. W.: Deep learning on disassembly data. Internet (2015), https://www.blackhat.com/docs/us-15/materials/us-15-Davis-DeepLearning-On-Disassembly.pdf). As far as we know, AndrewImage has not been introduced in any research paper. Compared with NatarajImage, AndrewImage embeds instruction-level information, which has better robustness and interpretability. Unfortunately, AndrewImage uses so much zero padding that the accuracy still remains a challenge.

SUMMARY

In view of the above defects of the prior art, the technical problem to be solved by the present disclosure is to provide vectorization method for malware with good robustness and to build an efficient deep neural network to reduce human cost, increase efficiency and robustness in malware classification.

In order to achieve above purpose, the present application provides a large-scale malware classification system and process based on deep learning, which greatly improves the classification accuracy and performance of large-scale malware. At the same time, the system model has simple structure and strong robustness, which can well meet the performance requirements of known or variant malware large-scale classification tasks. In order to simplify the development and use of the system, the whole system adopts browser/server architecture, and the core functions are implemented in the server. Inspired by word embedding, the system model remodels the task of malware classification, and innovatively designs a method of malware embedding based on disassembly file, which endows instruction level interpretability of embedding vector and enhances the robustness of malware embedding. At the same time, based on the concept of sentence-level classification task in natural language processing (NLP), a new deep neural network is designed to meet the performance requirements of large-scale malware analysis.

The large-scale malware classification system provided by the present application a client for unloading malware and a server for receiving and classifying the malware, wherein the server comprises a deep learning module for classifying the malware.

In a preferred embodiment, the system further comprises a database module, which is configured to periodically collect malware, label the malware, and build malware classification data set.

In a preferred embodiment, the server further comprises a reporting module for reporting classification results to the client and the client is configured to be capable of receiving the classification results.

In a preferred embodiment, the deep learning module is configured to study on the supervised data set and obtain a well-trained model at a training stage.

In a preferred embodiment, the system further comprises:
a disassembly module for disassembling and analyzing the malware and output a malware disassembly file; and
a malware embedding module for mapping the malware disassembly file to a malware vector;
wherein the malware vector is configured to be inputted into the deep learning module.

In a preferred embodiment, the malware disassembly file contains the information including malware section, address, instruction, opcode and operand.

In a preferred embodiment, the malware embedding module is configured to be capable of using Unicode to encode the malware disassembly file, truncating each encoded value from a high order to 8-bit, outputting a gray vector, and reshaping the gray vector to (m, 64).

In a preferred embodiment, the deep learning module is configured to use a convolution neural network with finite layers to extract and generalize the features in the malware vector.

In a preferred embodiment, the deep learning module is configured to be capable of using hash value of malware as fingerprint information for match in the database module, carrying out multi antivirus engine scanning and family labeling, and updating obtained information to the database module.

In a preferred embodiment, the deep learning module is configured to be capable of be periodically trained with updated labeled malware.

In a preferred embodiment, the deep learning network is characterized by that:

channel stacking is used to transform the inputted (m, 64) vector into (m/k, 64, k), so as to realize the stacking of assembly instructions in the channel direction;

convolution module with finite layers is used, wherein each convolution module contains a convolution unit, a batch normalization unit, an activation unit and a max pooling unit;

global max pooling is used to sample the outputted eigenvector of convolution module; and a two-layer fully connected block is used, wherein each layer of fully connected block contains a fully connected unit, a batch normalization unit and an activation unit.

Compared with the prior art, the large-scale malware classification system and process based on deep learning provided by the present application have the advantages as follows. The system automatically collects malware samples from the network space, carries out prior family standards based on multiple antivirus engines, and ensures the periodic update of deep learning network. The system constructs malware embedding vectors at the instruction level based on disassembly files. It contains the most essential and instruction level features of malware, and its vector is also robust. At the same time, the deep neural network uses convolutional neural network to automatically extract and generalize high-dimensional features in the malware vector, and uses batch normalization and global max pooling to accelerate the neural network to ensure the convergence speed of the model.

In the following contents, the concept, specific structure and technical effect of the present disclosure will be further described in combination with the drawings, so as to fully understand the purpose, features and effect of the disclosure.

DETAILED DESCRIPTION

Figure 1:
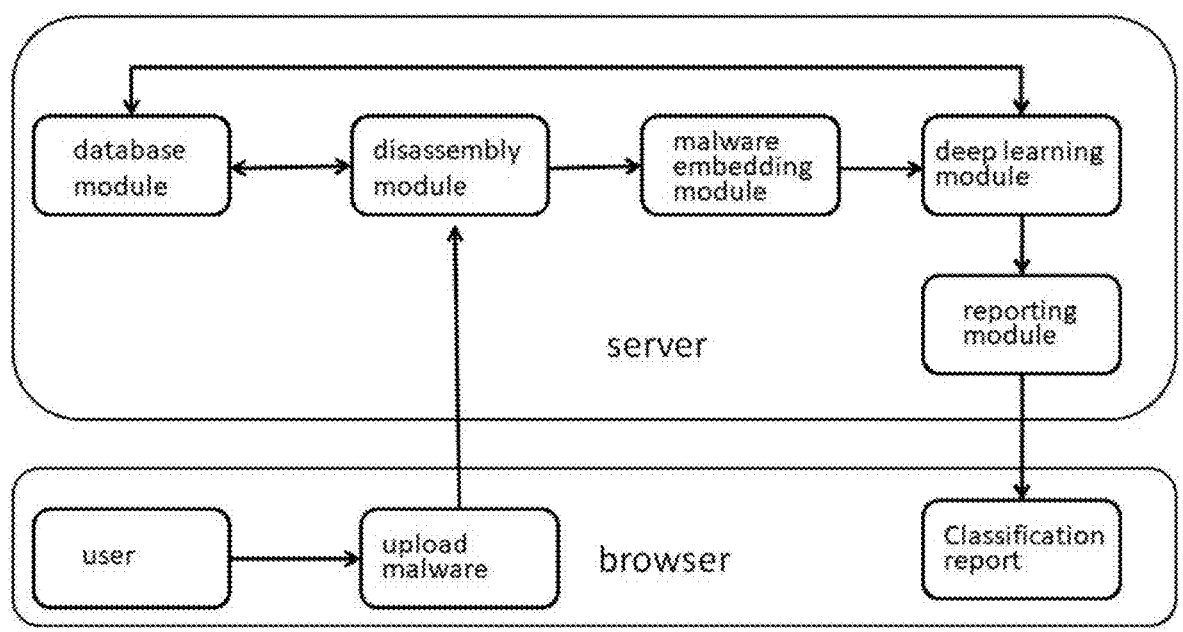
FIG. 1 is a schematic diagram showing a large-scale malware classification system based on deep learning in a preferred embodiment of the present disclosure.

Several preferred embodiments of the present disclosure are described with reference to the drawings of the specification, so that the present disclosure is clearer and easier to be understood. The present disclosure can be realized by many different forms of embodiments, and the protection scope of the present disclosure should not be limited to the embodiments mentioned herein.

In the drawings, the same components are represented by the same reference numbers, and the components with similar structure or function are represented by the similar reference numbers. The size and thickness of each component shown in the drawings are arbitrarily shown, and the present disclosure does not limit the size and thickness of each component. In order to make the drawings clearer, the thickness of the parts is appropriately exaggerated in some places in the drawings.

FIG. 1 is a schematic diagram showing a large-scale malware classification system based on deep learning in a preferred embodiment of the present disclosure. The whole system adopts browser/server architecture, and the server includes database module, disassembly module, malware embedding module, deep learning module and reporting module. The core functions are implemented on the server side.

The database module is configured to periodically collect malware from network, especially from major open-source malware platforms, label known families of malware based on multiple antivirus engines, build malware classification data set, and save the analysis results of each module.

The disassembly module contains a disassembly tool which is configured to disassemble and analyze the collected malware. The malware binary file is inputted and the malware disassembly file contains information including malware section, address, instruction, opcode and operand.

The malware embedding module contains a method of malware embedding provided by the present disclosure. The malware disassembly file is inputted and the malware vector is outputted. The malware disassembly file is mapped to the vector space and the malware vector is outputted.

The deep learning module contains the deep neural network architecture for the malware embedding method provided by the present disclosure. In the training stage, the deep learning module learns on the supervised malware sample set to be a well-trained model. In the detection stage, the malware vector is inputted into the model and the malware family information is outputted to obtain the classification results. The whole deep neural network architecture uses 4-layer convolutional neural network to extract and generalize the instructions and other features in the malware vector, and uses the batch normalization and global max pooling method to accelerate the neural network. The malware data set with family labels constructed in the database module is used for learning to obtain a well-trained model. The malware vector is inputted into the well-trained model and the malware family information is outputted.

The reporting module is configured to report the classification results according to the information in the database module and the results of deep learning module. The reporting module is unnecessary sometime. The presentation of classification results can be achieved by docking with other software or interfaces or in other ways.

The browser in the large-scale malware classification system based on deep learning is configured to upload malware by users and present the generated classification results report. Users only need to use any electronic device with browser function to access the Internet to upload malware, and read the classification result report of large-scale malware classification system based on deep learning.

The large-scale malware classification process based on deep learning in this embodiment comprises the steps of:

S1: inputting malware into a database module for query, analysis and archiving;

S2: inputting a malware binary file into a disassembly module and outputting a malware disassembly file;

S3: mapping the malware disassembly file to vector space and outputting a malware vector;

S4: training a deep learning network with labeled malware vector and outputting a well-trained deep learning network;

S5: inputting the malware vector into the well-trained deep learning network for classification, outputting a family tag, and archiving the results in the database module;

S6: reporting the classification results according to the archiving results in the database module.

The query of malware in the database module comprises the steps of:
S1-1: using hash value of malware sample as fingerprint information for match in the database module;
S1-2: carrying out multi antivirus engine scanning and family labeling, and updating the information in the database module, if it is not matched.

The step of mapping the malware disassembly file to vector space comprises the steps of:
S3-1: using Unicode to encode the malware disassembly file, and outputting the encoded value vector;
S3-2: truncating each encoded value from a high order to 8-bit, and outputting a gray vector;
S3-3: reshape the gray vector to (m, 64).

The step of training a deep learning network with labeled malware vector comprises the steps of:
S4-1: collecting malware samples automatically by database module, labeling the malware samples with known families based on multi antivirus engine, and constructing labeled sample set of malware classification;
S4-2: periodically training the deep learning network with updated labeled malware, and obtaining the latest deep learning model.

The step of inputting the malware vector into the well-trained deep learning network for classification comprises the steps of:
S5-1: saving the malware samples uploaded by users and calculating the hash value as the global fingerprint;
S5-2: matching the malware fingerprint obtained in step S5-1 in the database module;
S5-3: proceeding to step S5-7 if the matching result of step S5-2 exists, otherwise proceeding to step S5-4;
S5-4: disassembling the malware saved in step S5-1 to obtain the disassembly file;
S5-5: inputting the disassembly file obtained in step S5-4 into the malware embedding module, and outputting the malware vector;
S5-6: inputting the malware vector obtained in step S5-5 into the deep neural network, outputting the malware family information, and archiving the results in the database.

The deep learning network is characterized by that:
channel stacking is used to transform the inputted (m, 64) vector into (m/k, 64, k), so as to realize the stacking of assembly instructions in the channel direction;
convolution module with finite layers is used, wherein each convolution module contains a convolution unit, a batch normalization unit, an activation unit and a max pooling unit;
global max pooling is used to sample the outputted eigenvector of convolution module; and
a two-layer fully connected block is used, wherein each layer of fully connected block contains a fully connected unit, a batch normalization unit and an activation unit.

In this preferred embodiment, malware embedding maps malicious software into a vector space, helps learning algorithms to obtain better performance in malware analysis tasks. Similar to word embedding in Natural Language Processing (NLP), this choice has several advantages including: simplicity, effectiveness and the observation that some image-based models trained on huge malware dataset outperform most of traditional signature-based and behavior-based methods.

APE malware disassembly file generated by IDA Pro contains two aspects of information including hexadecimal instruction and corresponding metadata, i.e. section name, address of instruction, opcode and operand. The information is embedded as following steps: 1. encode malware disassembly file with UTF-8; 2. obtain gray vector by truncating each encoded value from a high order to 8-bit; and 3. reshape the gray vector to (m, 64). In fact, the image retains instruction-level interpretability by reshaping the gray vector to (m, 64).

By analyzing samples in Microsoft malware classification challenge dataset (BIG2015), the cumulative distribution function (CDF) of instruction length in samples is obtained, which indicates that 99% of instructions do not exceed 64 bits and 82% of instructions do not exceed 32 bits. Therefore, L=64 is chosen to cover almost all instructions while maintaining smaller vector size. Differently, this image does not truncate each line vector to 64-bit, as an alternative, the vector is reshaped to (m, 64). Since 64-bit is almost sufficient for a line of disassembly file encoded by UTF-8, m can be approximated as number of instruction lines, i.e. instruction quantity.

Another problem of this image is how many lines of instructions should be embedded, i.e. how to choose m. It is obviously that the larger m can lead to better accuracy without considering performance. However, when the model reaches certain accuracy, m should be as small as possible. The instruction quantity in disassembly file varies greatly. 50% of files contain no more than 3200 instructions, and 69% of files contain no more than 6400. In this preferred embodiment, 3200 and 6400 are chosen as two candidate values of m.

Figure 2:
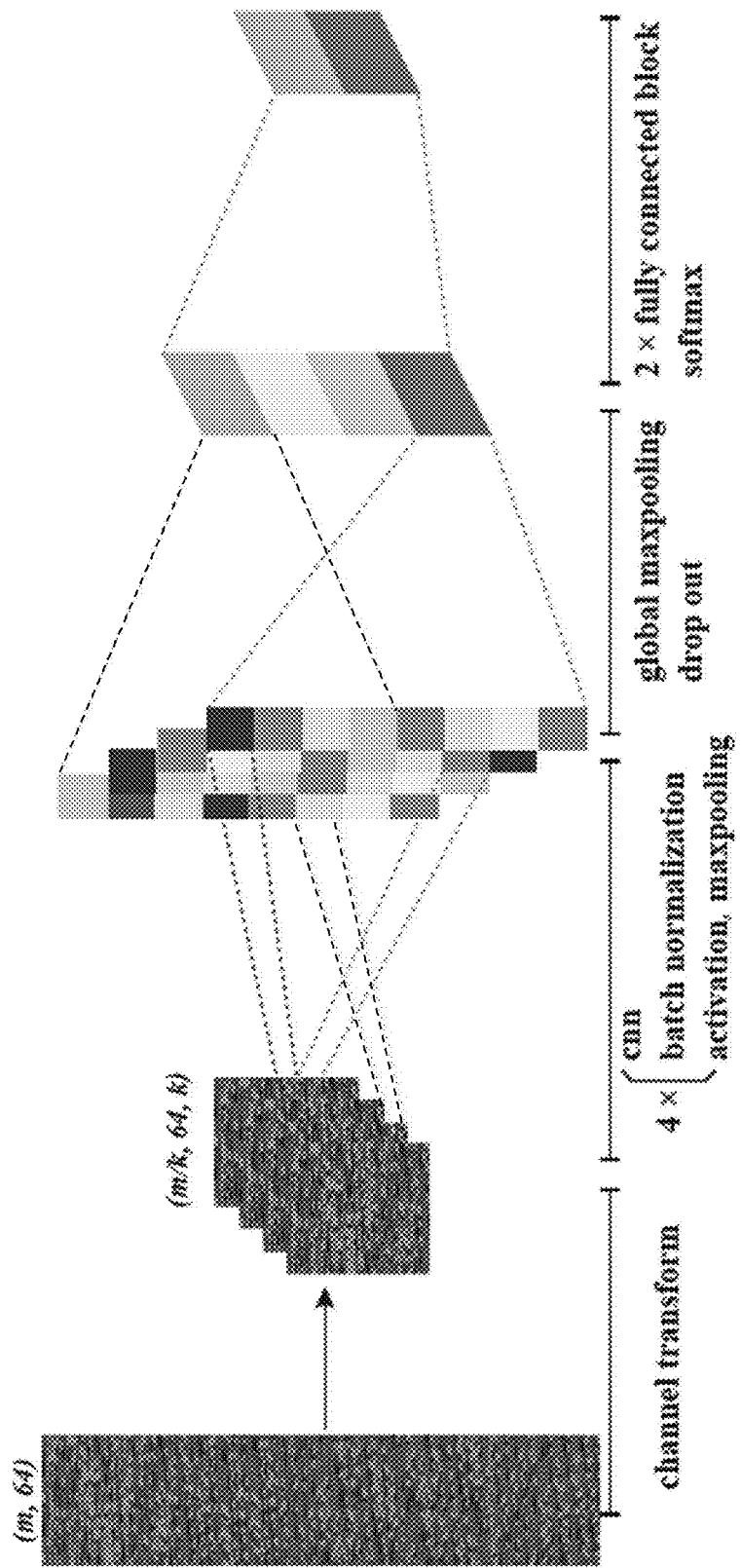
FIG. 2 is a schematic diagram showing a deep learning model in a preferred embodiment of the present disclosure.

FIG. 2 is a schematic diagram showing a deep learning model in a preferred embodiment of the present disclosure. As shown in FIG. 2, malware embedding outputs an image vector with size (m, 64), where m represents the number of instructions. Channel transformation is designed to turn vector into a new shape of (m/k, 64, k), in which k represents the number of channels.

A special value k=1 can be used to illustrate this model.

First, let $S_j \in R^{64}$ be the 64-dimensional instruction vector corresponding to the j-th instruction in m. Then, a malware sample Xi is represented as: $X_i=[S_1, S_2, \ldots, S_j, \ldots, S_m]$. Each convolution layer includes several filters $w \in R^{hc}$, which apply a window with size (h,c). For instance, $c_{i,t}$ is a vector generated from a window $X_{i:i+h}(t:t+c)$ by $c_{i,t}=w \cdot X_{i:i+h}(t:t+c)+b$, where $b \in R$ is bias. When a row convolution is finished, a new row feature vector is obtained as follows: $c_i=[c_{i,1}, c_{i,2}, \ldots, c_{i,64}]$. Similarly, when whole convolution is completed, a new abstract instruction vector is generated, i.e. $c=[c_1, c_2, \ldots, c_i, \ldots, c_m]$. Then, batch normalization (BN) is applied on c. Details of BN on mini-batch are in Table 1.

TABLE 1

The algorithm of batch normalization on mini-batch

Input: c value on each mini-batch $\varphi = \{c_{1\ldots n}\}$
1:    parameters to learn $\gamma$, $\beta$
Output: $e_i = BN_{\beta,\gamma}(c_i)$ 2:    calculate mean of mini-batch $\mu \leftarrow \frac{1}{n}\sum_{i=1}^{n} c_i$ 3:    calculate variance of mini-batch $\sigma_\varphi^2 \leftarrow \frac{1}{n}\sum_{i=1}^{n}(c_i - \mu_\varphi)^2$ TABLE 1-continued The algorithm of batch normalization on mini-batch 4: standardize $\hat{c}_i \leftarrow \dfrac{c_i - \mu_\varphi}{\sqrt{\sigma^2 + e}}$ 5: scale and shift $e_i \leftarrow \gamma \hat{c}_i + \beta \equiv BN_{\beta,\gamma}(c_i)$ Recent research has shown that BN can smooth the objective function, which is significant to accelerate deep neural network. After that, a non-linear activation function f and max-pooling on $e_i$ can be used, which aims to reduce the dimension of the feature vector. $e=\text{maxpooling}(f([e_1, e_2, \ldots, e_i, \ldots, e_m]))$; $e_i=BN_{\beta,\gamma}(c_i)$. So far, the process of one CNN block in this model is described, which uses four similar CNN blocks. Therefore, the input of global max-pooling is a normalized, activated and pooled feature vector, i.e. $e=[e_1, e_2, \ldots, e_g]$, where g is determined by the specific parameters of the before layers. In order to preserve the most important features (one with highest value) while reducing the dimension of the final feature vector, global max-pooling on e and take $\hat{e}=\max\{e\}$ can be applied as the final instruction-level features vector. Finally, two fully-connected blocks and a softmax layer are used to get: $y=[y_1, y_2, \ldots, y_n]$, in which $y_i$ is the probability of malware family i, n represents the number of malware families. The idea of sentence-level classification is used to construct the entire model. In theory, it is more suitable for instruction-level malware embedding methods.

BIG2015 contains 21741 malware samples of 9 different families, i.e. Ramnit (F1), Lollipop (F2), Kelihos_ver3 (F3), Vundo (F4), Simda (F5), Tracur (F6), Kelihos_ver1 (F7), Obfuscator.ACY (F8) and Gatak (F9). Since only 10868 training samples in BIG2015 are labeled, this part is chosen as experimental dataset in this preferred embodiment. The dataset is extremely unbalanced. Therefore, the following two methods is combined to eliminate the impact of this unbalance on the model. Firstly, F4, F5 and F7 are randomly up-sampled to 500. Secondly, a loss function weight that is inversely proportional to the class frequency is set in the input data.

This model is evaluated on the following platform environment:
hardware: 2×GeForce GTX 1080 @ 8 GB, 1×E5-2630 v3 @ 2.40 GHz, 32 GB of memory; software: CentOS 7.4, python 3.6.5, tensorflow-gpu 1.8.0, Keras 2.2.0, scikit-learn 0.19.1, numpy 1.14.3, Pillow 5.1.0.

Loss function of the model is cross entropy, which is defined in equation:

$$\text{loss} = -\dfrac{1}{M} \sum_i^M \sum_j^N y_{ij} \log p_{ij}. \qquad (1)$$

where M is the number of samples in min-batch, N is the number of malware classes, $y_{ij}$ is 1 if sample i is in class j, otherwise, $y_{ij}$ is 0, and $p_{ij}$ is the predicated probability of sample i in class j.

At the same time, accuracy, precision, recall and f1-score are chosen to evaluate the performance of the model.

In this preferred embodiment, hyperparameters in the model is considered further. Firstly, it is the instruction quantity m. Experiment results as shown in the following Table 2 indicate this image has good outperforms on all metrics regardless of m. In particular, when m reaches 6400, the accuracy of this image is increased. Intuitively, a larger m covers more instruction information, which should achieve a higher accuracy. In fact, when m increases to 6400, the accuracy of this image is only slightly improved, however the training time almost increases by half. Therefore, this model takes m=3200.

TABLE 2

The impact of instruction quantity m

| Method | m | accuracy(%) | precision(%) | recall(%) | train_time (h) |
|---|---|---|---|---|---|
| YongImage | 3200 | 99.49 | 99.51 | 99.51 | 1.70 |
|  | 6400 | 99.55 | 99.57 | 99.56 | 3.23 |

Note:
BIG2015 10-fold cross-validation results; k = 1

Second hyperparameter is k, which represents the initial number of channels. In fact, the initial idea is to analyze the correlation between instructions by stacking k instructions in the channel direction to obtain higher model accuracy. However, the experimental results in following Table 3 indicate that this design is only beneficial to accelerate model training. In order to achieve better accuracy, k=1 is chosen finally.

TABLE 3

The impact of channel parameter k

| Method | k | accuracy(%) | precision(%) | recall(%) | train_time(h) |
|---|---|---|---|---|---|
| Image | 1 | 99.49 | 99.51 | 99.51 | 1.70 |
|  | 4 | 98.87 | 98.89 | 98.87 | 1.01 |
|  | 8 | 98.54 | 98.57 | 98.54 | 0.69 |

Note:
BIG2015 10-fold cross-validation results; m = 3200

10-fold cross-validation on BIG2015 is used to evaluate the above hyperparameters. Particularly, the detail results of this image with k=1 and m=3200 is that the average accuracy is 99.49%, and the average training time is 1.70 h.

The model in this preferred embodiment is also compared with several methods that have performed well on BIG2015 in recent years. The model in this preferred embodiment has obvious advantages despite the differences in the experimental platform. Firstly, a new image is used as the only input feature vector, model preprocessing and training are relatively simple, and certainly, detection is faster. Secondly, benefit from instruction embedding and sentence-level modeling, the solution in this preferred embodiment is more robust and interpretable. Therefore, the model in this preferred embodiment is the advanced solution for large-scale malware classification tasks.

What is claimed is:

1. A malware classification system, comprising a client for unloading malware and a server for receiving and classifying the malware;
   a database module, which is configured to periodically collect malware, label the malware, and build malware classification data set;
   a disassembly module for disassembling and analyzing the malware and output a malware disassembly file; and
   a malware embedding module for mapping the malware disassembly file to a malware vector, wherein
   the server comprises a deep learning module for classifying the malware;

the malware vector is configured to be inputted into the deep learning module; and the malware embedding module is configured to be capable of using Unicode to encode the malware disassembly file, truncating each encoded value from a high order to 8-bit, outputting a gray vector, and reshaping the gray vector to (m, 64).

2. The system of claim 1, wherein the server further comprises a reporting module for reporting classification results to the client and the client is configured to be capable of receiving the classification results.

3. The system of claim 1, wherein the deep learning module is configured to study on the supervised data set and obtain a model at a training stage.

4. The system of claim 1, wherein the malware disassembly file contains the information including malware section, address, instruction, opcode and operand.

5. The system of claim 1, wherein the deep learning module is configured to use a convolution neural network with finite layers to extract and generalize the features in the malware vector.

6. The system of claim 5, wherein the deep learning module is configured to be capable of using hash value of malware as fingerprint information for match in the database module, carrying out multi antivirus engine scanning and family labeling, and updating obtained information to the database module.

7. The system of claim 5, wherein the deep learning module is configured to be capable of be periodically trained with updated labeled malware.

8. The system of claim 5, wherein the deep learning module is characterized by that: channel stacking is used to transform the inputted (m,64) vector into (m/k, 64, k), so as to realize the stacking of assembly instructions in the channel direction;

convolution module with finite layers is used, wherein each convolution module contains a convolution unit, a batch normalization unit, an activation unit and a max pooling unit;

global max pooling is used to sample the outputted eigenvector of convolution module;

and a two-layer fully connected block is used, wherein each layer of fully connected block contains a fully connected unit, a batch normalization unit and an activation unit.

* * * * *